(12) United States Patent
Lehmann et al.

(10) Patent No.: US 8,703,655 B2
(45) Date of Patent: Apr. 22, 2014

(54) DISPERSING SULFIDE SCALES IN OIL AND GAS PRODUCTION SYSTEMS

(75) Inventors: Marc N. Lehmann, Houston, TX (US); Faezeh F. Firouzkouhi, Sugar Land, TX (US); Michael P. Squicciarini, Richmond, TX (US); Tauseef Salma, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 1407 days.

(21) Appl. No.: 12/135,415

(22) Filed: Jun. 9, 2008

(65) Prior Publication Data

US 2009/0143252 A1    Jun. 4, 2009

Related U.S. Application Data

(60) Provisional application No. 60/944,404, filed on Jun. 15, 2007.

(51) Int. Cl.
*C09K 8/52* (2006.01)

(52) U.S. Cl.
USPC ............................................. 507/90; 507/225

(58) Field of Classification Search
None
See application file for complete search history.

(56) References Cited

U.S. PATENT DOCUMENTS

| | | | |
|---|---|---|---|
| 4,187,277 A * | 2/1980 | Quinlan | 422/16 |
| 4,454,914 A | 6/1984 | Watanabe | |
| 4,869,828 A | 9/1989 | Hoots et al. | |
| 5,171,459 A | 12/1992 | Kaplan | |
| 5,246,072 A | 9/1993 | Frazier, Jr. et al. | |
| 5,266,186 A | 11/1993 | Kaplan | |
| 5,996,692 A | 12/1999 | Chan et al. | |
| 6,000,412 A | 12/1999 | Chan et al. | |
| 6,130,199 A | 10/2000 | Chan et al. | |
| 6,436,878 B1 * | 8/2002 | Wang et al. | 507/119 |
| 6,866,797 B1 | 3/2005 | Martin et al. | |
| 7,159,655 B2 * | 1/2007 | Ke et al. | 166/279 |
| 7,270,180 B2 | 9/2007 | Ke et al. | |
| 2005/0067164 A1 * | 3/2005 | Ke et al. | 166/304 |
| 2005/0215439 A1 * | 9/2005 | Blair | 507/222 |

FOREIGN PATENT DOCUMENTS

| | | | |
|---|---|---|---|
| EP | 0 464 993 A1 * | 1/1992 | |
| WO | WO2007080417 A1 | 7/2007 | |

OTHER PUBLICATIONS

The elements of polymer science, by Alfred Rudin, p. 49.*
M. Lehmann et al., A New Chemical Treatment to Inhibit Iron Sulfide Deposition, SPE-114065, 2008 SPE International Oilfield Scale Conference, Aberdeen, UK, May 28-29, 2008, pp. 1-31.
Rocky Mountain Oilfield Testing Center, The Biocompetitive Exclusion Process, RMOTC/FA/97PT5, Nov. 1997, pp. 1-2.

* cited by examiner

*Primary Examiner* — Randy Gulakowski
*Assistant Examiner* — Jeffrey Washville
(74) *Attorney, Agent, or Firm* — Mossman, Kumar & Tyler

(57) ABSTRACT

A homopolymer of a monomer selected from those having the general formula:

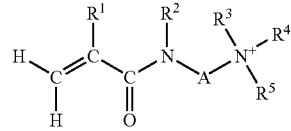

wherein: R1 is H or CH3; R2 is H or an alkyl group having from 1 to about 4 carbon atoms; A is a straight or branched chain alkyl group having from 1 to 10 carbon atoms; and R3, R4, and R5 each are independently an alkyl group having from 1 to 6 carbon atoms; or a copolymer of such monomers as acrylate, acrylamide or methacrylamide may be used to disperse metal sulfides prior to their forming scales during the production and transportation of crude oil. Terpolymers of dimethyldiallylammonium salt, 2-hydroxypropyl acrylate; and acrylic acid may also be used for this purpose. The production fluid may also be treated with a compound that promotes the formation of dispersible sulfide scales.

16 Claims, No Drawings

DISPERSING SULFIDE SCALES IN OIL AND GAS PRODUCTION SYSTEMS

CROSS REFERENCE TO RELATED APPLICATION

This application claims priority from U.S. Provisional Patent Application 60/944,404; which was filed on Jun. 15, 2007 and which is fully incorporated by reference in its entirety.

BACKGROUND OF THE INVENTION

1. Field of the Invention

The present invention relates to preventing or mitigating scale formation during oil and gas production. The present invention particularly relates to preventing or mitigating the formation of sulfide scales during oil and gas production.

2. Description of the Prior Art

The forming of scale during the production and transportation of crude oil has long been a problem. The formation of scale can slow oil production rate and, in extreme circumstances, stop production completely. Scale may also be a major problem in downstream equipment such as separators, desalters, pipelines and the like. Even pipelines and, in offshore fields, flow lines may be adversely affected by scale.

Some scale species are formed from the interaction of metals and inorganic anions. For example, the combination products of calcium cations with carbonate anions or phosphate anions will precipitate from the water in which the ions are carried to form scale deposits when the concentrations of these anions and cations exceed the solubility of the reaction product.

Other common scale forming ions are calcium and barium, but sodium, carbonate, bicarbonate, chloride, sulfate, and strontium are also recognized as scaling species. The most common speciation of these combined scaling ions are: calcium carbonate ($CaCO_3$), calcium sulfate ($CaSO_4$), barium sulfate ($BaSO_4$), and strontium sulfate ($SrSO_4$).

In addition to the scaling species described above, crude oil will often include other materials which may form scale or scale like deposits down stream. For example, most crude oil will have agglomerative materials such as paraffins and asphaltenes. Most crude oil will also have clays and silica. All of these materials are known to contribute to problems with downstream equipment used to move and process crude oil Sulfide scales, especially iron sulfide (FeS) can cause significant production problems and safety hazards for producers. Iron sulfide scale often causes restricted production by plugging flow paths in the reservoir, perforations, pump intakes, and tubulars. This problem may be especially acute in reservoirs flooded with water containing significant sulfates. The influx of sulfate can stimulate indigenous sulfate reducing bacteria, which metabolize the sulfate into hydrogen sulfide gas. The hydrogen sulfide then reacts with metallic compounds such as iron to form iron sulfide, which appears as a black scale. Producers often use hydrochloric acid treatments to clean up iron sulfide scale. These treatments can produce deadly $H_2S$ gas and are usually expensive. If water disposal systems are required to handle sour produced water, the maintenance costs will increase even further as the pumps, filtration systems, injection lines, and injection wells are attacked by sulfide scale and corrosion.

SUMMARY OF THE INVENTION

In one aspect, the invention is a method for preventing or mitigating the formation of sulfide scale comprising treating production fluid with an additive comprising a homopolymer of a monomer selected from those having the general formula:

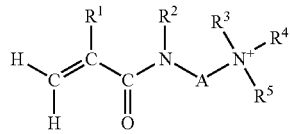

wherein: R1 is H or CH3; R2 is H or an alkyl group having from 1 to about 4 carbon atoms; A is a straight or branched chain alkyl group having from 1 to 10 carbon atoms; and R3, R4, and R5 each are independently an alkyl group having from 1 to 6 carbon atoms.

In another aspect, the invention is a method for preventing or mitigating the formation of sulfide scale comprising treating production fluid in downstream equipment with an additive comprising a copolymer of a first monomer selected from those having the general formula:

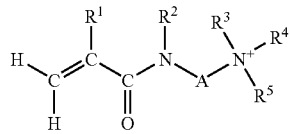

wherein: R1 is H or CH3; R2 is H or an alkyl group having from 1 to about 4 carbon atoms; A is a straight or branched chain alkyl group having from 1 to 10 carbon atoms; and R3, R4, and R5 each are independently an alkyl group having from 1 to 6 carbon atoms; and a second monomer selected from the group consisting of acrylate, acrylamide and methacrylamide.

In still another aspect, the invention is a method for preventing or mitigating the formation of sulfide scale comprising treating production fluid with an additive comprising a terpolymer of dimethyldiallylammonium salt, 2-hydroxypropyl acrylate; and acrylic acid.

DESCRIPTION OF THE PREFERRED EMBODIMENTS

The term "polymer" for the purposes of this application means a composition prepared from one or more monomers. Specifically included within the term polymer are homopolymers, copolymers and terpolymers.

In one embodiment, the invention is a method of preventing or mitigating the formation of metal sulfide scales. The metal sulfide scales may be, for example, iron sulfides. Alternatively, the metal sulfides may also include minor amounts of lead sulfides or zinc sulfides or be a combination of iron and lead and/or zinc sulfides. When the metal sulfide scales are iron sulfide scales, they may be troilite (FeS) or pyrite ($FeS_2$). Alternatively, the iron sulfide scales may be mackinawite ($Fe_9S_8$) or phyrrhotite ($Fe_7S_8$).

In practicing at least one embodiment of the method of the invention, production fluid is treated with an additive comprising a homopolymer of a monomer selected from those having the general formula:

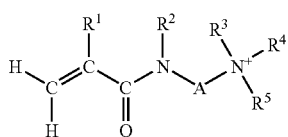

wherein: R1 is H or CH3; R2 is H or an alkyl group having from 1 to about 4 carbon atoms; A is a straight or branched chain alkyl group having from 1 to 10 carbon atoms; and R3, R4, and R5 each are independently an alkyl group having from 1 to 6 carbon atoms Exemplary homopolymers useful with the method of the invention include, but are not limited to the homopolymers prepared using a monomer selected from the group consisting of:

3-(methacrylamido)propyltrimethylammonium salt;
3-(acrylamide)propyltrimethylammonium salt;
dimethylaminoethyl methacrylate methyl salt quaternary;
dimethylaminoethyl methacrylate dimethylsulfate quaternary;
dimethylaminoethyl acrylate dimethylsulfate quaternary; and
dimethylaminoethyl acrylate methyl salt quaternary.

The counter ions useful with the method of the invention include any anion that does not interfere with the polymerization of the cations. For example, any halide may be used. Other anions may also be used, including but not limited to $RSO_4^-$; $HCO_3^-$; and the like.

The homopolymers useful with the method of the invention may have a molecular weight (Mn) of from about of from about 5,000,000 daltons to about 5,000 daltons. In one embodiment, the homopolymers have a molecular weight (Mn) of from about of from about 1,000,000 daltons to about 7,500 daltons. In still another embodiment, the homopolymers have a molecular weight (Mn) of from about of from about 100,000 daltons to about 10,000 daltons. These homopolymers may be prepared using any method known to be useful to those of ordinary skill in the art of preparing polymers including, but not limited to emulsion polymerization, free radical polymerization, and also polymerizing the monomers in the presence of a free radical initiator.

In another aspect, the invention is a method for preventing or mitigating the formation of metal sulfide scales comprising treating production fluid in downstream equipment with an additive comprising a copolymer of a first monomer selected from those having the general formula:

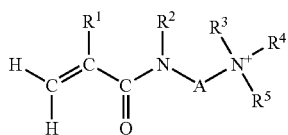

wherein: R1 is H or CH3; R2 is H or an alkyl group having from 1 to about 4 carbon atoms; A is a straight or branched chain alkyl group having from 1 to 10 carbon atoms; and R3, R4, and R5 each are independently an alkyl group having from 1 to 6 carbon atoms; and a second monomer selected from the group consisting of acrylamide and methacrylamide. The monomers and cations already described may be used for the first monomer. The acrylamide and methacrylamide may be ether technical or, if high purity is required or desired, high purity grades.

The copolymers useful with the present invention may be prepared wherein the molar ratio of the first monomer to the second monomer is from about 1:3 to about 3:1. In some embodiments, it may be desirable that the ratio be from about 1:2 to about 2:1. In other embodiments, the molar ratio of the monomers is about 1:1.

The copolymers useful with the method of the invention may have a molecular weight of from about 5,000,000 daltons to about 5,000 daltons. In one embodiment, the copolymers have a molecular weight (Mn) from about of from about 1,000,000 daltons to about 7,500 daltons. In still another embodiment, the copolymers have a molecular weight (Mn) of from about of from about 100,000 daltons to about 10,000 daltons. These copolymers may be prepared using any method known to be useful to those of ordinary skill in the art of preparing polymers including, but not limited to emulsion polymerization, free radical polymerization, and also polymerizing the monomers in the presence of a free radical initiator.

In still another embodiment, the additive useful with the method of the invention is a terpolymer. The monomers used to prepare the terpolymer are dimethyldiallylammonium salt, 2-hydroxypropyl acrylate; and acrylic acid. The counter ions and polymerization methods useful with this embodiment of the invention are the same as those already discussed herein.

The terpolymer is prepared with a molar ratio of the dimethyldiallylammonium salt to 2-hydroxypropyl acrylate to acrylic acid of about 3:1:3. This ratio may be varied by up to 50 percent of each monomer independently. For example, molar ratios which are within the scope of the invention include 4:1:3; 3:1.5:3; 3:1:4.5; and even 4:1:4.

The terpolymer may have a molecular weight of from about 5,000,000 daltons to about 5,000 daltons. In one embodiment, the terpolymer has a molecular weight (Mn) of from about of from about 1,000,000 daltons to about 7,500 daltons. In still another embodiment, the terpolymer has a molecular weight (Mn) of from about of from about 100,000 daltons to about 10,000 daltons. The terpolymer may be prepared using any method known to be useful to those of ordinary skill in the art of preparing polymers including, but not limited to emulsion polymerization, free radical polymerization, and also polymerizing the monomers in the presence of a free radical initiator.

The additives useful with the method of the present invention are added to crude oil, also known as production fluid. Depending upon what has been done to the crude oil, it may be a single phase or have multiple phases. The crude oil may be an oil in water emulsion or a water in oil emulsion. If allowed to stand, the crude oil may separate into distinct aqueous and non-aqueous phases that may or may not include both solid and dissolved contaminants. For the purposes of the present invention, all of these aspects of crude oil are collectively referred to as crude oil.

In the practice of the method of the invention, the additives useful with the method of the invention are introduced into crude oil. The amount of additive necessary to effectively mitigate or prevent metal sulfide scale production may vary with a number of variables. For example, the concentration of metal sulfides and water in the crude oil may affect the amount of additives needed. Those of ordinary skill in the art of producing and transporting crude oil are well versed in the art of determining proper dosages for treating the crude oil with additives. Still, generally, the crude oil, in the practice of the invention, the additives useful with the method of the invention may be introduced at a concentration of from about 1 ppm to about 10,000 ppm. In other embodiments, the concentration may be from about 1 ppm to about 10,000 ppm. In still other embodiments, the concentration may be from about 1 ppm to about 10,000 ppm.

The additives useful with the method of the present invention may be introduced into crude oil using any method known to be useful to those of ordinary skill in the art. In one embodiment of the present invention an automated additive injection system is used to introduce the additive into the crude oil. Typically, such an injection system will include a source of additive, a pump, at least one controller for setting the flow rate. In another embodiment, the controller is Sentry System™ automated controller available from Baker Hughes.

The additive of the present invention may be admixed with or co-injected with other additives useful in the production of crude oil. For example, they may be admixed with or co-injected with defoamers, asphaltene inhibitors, corrosion inhibitors, and any other materials that do not interfere with the function of the additives in mitigating the formation of sulfide scales.

The present invention is for an additive that functions to reduce the formation of sulfide scales both in an oil well and in downstream equipment. For purposes of the present invention, downstream equipment refers to the pipes, pipelines, vessels, truck, and the like used to transport crude oil from the oil field to the refinery and to any equipment with which the crude oil comes into contact. For example, such equipment may include, but is not limited to separators, dehydrators, strainers, centrifuged, cyclones, and electrostatic precipitators.

While not wishing to bound by any theory, it is believed that the additive functions by dispersing metal sulfides, particularly the iron sulfides thereby preventing or mitigating the formation of scale on equipment.

The level of hydrogen sulfide contained in oilfield produced fluids can be reduced by treating production fluids with a compound that promotes the formation of dispersible sulfide scales. Examples of such materials include salts such as oxides, acetates, formates, carbonates, and nitrates. Dispersed or chelated metals such as zinc, copper, iron, manganese, chromium, and/or mixtures may also be used.

In one embodiment of the invention, the dissolved hydrogen sulfide in produced fluids is converted to a metal sulfide scale of very small particle size that is selectively water wetted and/or dispersed into the water phase of the produced fluids by action of the surfactant or dispersant component. When the fluids are separated into oil and water phases, then the level of hydrogen sulfide in the oil is significantly reduced as a result of the treatment. a compound that promotes the formation of dispersible sulfide scales The method of the application, in one embodiment, includes treating a production fluid first with a compound that promotes the formation of dispersible sulfide scales, and then with an additive of the application. In an alternative embodiment, the invention may be practiced by treating a production fluid with one agent that includes both an additive of the application and a compound that promotes the formation of dispersible sulfide scales.

EXAMPLES

The following examples are provided to illustrate the present invention. The examples are not intended to limit the scope of the present invention and they should not be so interpreted. Amounts are in volume parts or volume percentages unless otherwise indicated.

Example 1 and Comparative Examples 2 & 3

A buffered bulk test brine is maintained under anaerobic conditions by applying thereto a nitrogen and carbon dioxide gas sparge maintained at a 10 psi overpressure. The ratio of the carbon dioxide and nitrogen flows are varied to achieve a desired pH. The brine is sparged for a period of one hour prior to use to achieve an aqueous solution containing less than 10 ppb of oxygen that is then considered for all practical purposes as being "deoxygenated" and representative as conditions that might be seen in an optimized oilfield system.

Separate stock solutions of ferrous sulfate, sodium sulfide nonahydrate, and dispersant chemicals are made by sealing known weights of the respective solids and liquids into separate 60 ml culture bottles. Each bottle is initially purged with nitrogen and then filled with the deoxygenated test brine (50 g) to achieve a desired concentration of the ferrous ions, sulfide ions, and the dispersant chemical. The concentrations of the dispersant stock solutions are then adjusted to account for the activities of the products.

The dispersion tests are conducted in glass serum bottles of approximately 60 ml capacity. Each bottle is initially sealed with a septum and purged with nitrogen. The test brine (50 g) is displaced into the septum bottles under the overpressure of the sparge gas.

Scaling solutions of iron sulfide are created by adding a volume of the sulfide stock solution (0.5 ml) and then a volume of the ferrous ion stock solution (0.5 ml) to the culture bottles pre-filled with the test brine (50 g). The solutions are then thoroughly mixed by placing the bottles on a rocking shaker for a period of fifteen minutes at room temperature.

The test brine shown in Table 1 is capable of precipitating about 23 mg/L of ferrous sulfide at room temperature.

After generation of the iron sulfide scale, the bottles are removed form the shaker and a volume of the dispersant stock solution (0.5 ml) is added to the culture bottles containing the iron sulfide scale, at which time observations of dispersion stability begin. Duplicate samples are generated to evaluate the efficacy of different dispersants both at room temperature and at elevated temperatures. Samples with no dispersant added are considered as the controls to the experiment.

An evaluation of the efficacy of the dispersants is conducted both at room temperature (~25° C.) and at a temperature of 150° F. (66° C.) by two alternate methods.

The efficacy of the dispersant products at room temperature are evaluated by determining the time required for the iron sulfide solids to settle from quiescent solutions. The efficacy of the products at elevated temperature are determined by shaking the culture bottles containing the dispersions in a hot water shaking bath for a period of twelve hours and then screening out those products that caused the iron sulfides to flocculate, and then measuring the resulting particle size of the dispersions for those products that were able to prevent flocculation.

Dispersions having the lowest average particle size are considered to show the greatest stability. The efficacies of the dispersant products were then ranked based on the ability to extend the settling time of the iron sulfide solids at room temperature, and the extent to which the products could prevent flocculation at elevated temperature, by affording solids with the smallest average particle size.

Table 1 displays the brine chemistry that is used in the screening studies and includes the final ferrous and sulfide ion concentrations after addition of the stock solutions.

TABLE 1

BRINE USED IN DISPERSION TESTS

| Ion | Concentration (mg/l) |
|---|---|
| $Na^+$ | 35,162 |
| $Fe^{2+}$ | 32 |
| $S^{2-}$ | 36 |
| $HCO_3^-$ | 200 |
| $Cl^-$ | 54,143 |
| pH at End of Rx | 6.3 |

Table 2 shows the settling times of iron sulfides in the presence and absence of 150 ppm of three products tested under quiescent conditions at room temperature.

Example 1 is a homopolymer prepared by polymerizing methacrylamido-propyltrimethylammonium chloride (58.6 wt. %) in de-ionized water (41.23 wt. %) in the presence of Vaso™ 56 WSP (0.17 wt. %), a low temperate free radical polymerization initializer. The monomer and catalyst is stirred in a 250 ml round bottom flask equipped with a mechanical stirrer, nitrogen inlet and condenser. Nitrogen is bubbled though the stirring solution at a rate of approximately 480 ml/min for 15 minutes. The temperature controller is then set to 60° C. A moderate exotherm is observed as the reaction temperature rises to 75-80° C. The controller is then set to 75° C. and the solution stirred for and additional 3 hrs.

Comparative Example 2 is a cocoa dimethyl amine

Comparative Example 3 is monosulfonated alkyldiphenyl ether as disclose in U.S. Pat. No. 5,171,459 as an effective component in formulations used to stabilize lead and zinc sulfide dispersions.

The results are shown below in the tables. In Table 2, the settling times of three products tested at 150 ppm are displayed. In Table 3 the particle size of the dispersion of iron sulfides after shaking at 150° F. for a period of 12 hours is displayed.

TABLE 2

SETTLING TIMES OF THREE PRODUCTS TESTED AT 150 PPM

| Sample | Settling Time (hours) |
|---|---|
| Blank | 1.5 |
| Example 1 | 120 |
| Comparative Example 2 | 5 |
| Comparative Example 3 | 3 |

Table 3 presents the particle size of the dispersion of iron sulfides after shaking at 150° F. for a period of 12 hours.

TABLE 3

AVERAGE PARTICLE SIZE IN IRON SULFIDE DISPERSIONS

| Sample | Average particle Size (μm) |
|---|---|
| Blank | 0.9 ± 3 |
| Example 1 | 0.24 ± 0.20 |
| Comparative Example 2 | 8.93 ± 11.4 |
| Comparative Example 3 | 1.0 ± 6.0 |

What is claimed is:

1. A method for preventing or mitigating the formation of sulfide scale comprising treating production fluid with an additive comprising a homopolymer prepared using a formulation comprising a first monomer selected from the group having the general formula:

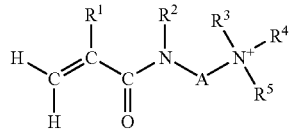

wherein: R1 is H or CH3; R2 is H or an alkyl group having from 1 to about 4 carbon atoms; A is a straight or branched chain alkyl group having from 1 to 10 carbon atoms; and R3, R4, and R5 each are independently an alkyl group having from 1 to 6 carbon atom;

wherein the production fluid is treated after it is recovered from an oil well.

2. The method of claim 1 wherein the homopolymer is selected from the group consisting of:
   3-(methacrylamido)propyltrimethylammonium salt;
   3-(acrylamide) propyltrimethylammonium salt;
   dimethylaminoethyl methacrylate methyl salt quaternary;
   dimethylaminoethyl methacrylate dimethylsulfate quaternary;
   dimethylaminoethyl acrylate dimethylsulfate quaternary; and
   dimethylaminoethyl acrylate methyl salt quaternary.

3. The method of claim 2 wherein the homopolymer has a molecular weight (Mn) of from 5,000 to about 5,000,000.

4. The method of claim 3 wherein the homopolymer has a molecular weight (Mn) of from 7,500 to about 1,000,000.

5. The method of claim 4 wherein the homopolymer has a molecular weight (Mn) of from 10,000 to about 100,000.

6. The method of claim 1 further comprising treating the production fluid with a compound that promotes the conversion of hydrogen sulfide to a dispersible sulfide scale.

7. A method for preventing or mitigating the formation of sulfide scale comprising treating a production fluid with an additive comprising a copolymer prepared using a formulation comprising:
   a first monomer selected from the group having the general formula:

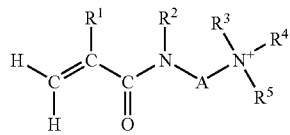

wherein: R1 is H or CH3; R2 is H or an alkyl group having from 1 to about 4 carbon atoms; A is a straight or branched chain alkyl group having from 1 to 10 carbon atoms; and R3, R4, and R5 each are independently an alkyl group having from 1 to 6 carbon atoms; and a second monomer selected from the group consisting of an acrylate, acrylamide, and methacrylamide, wherein the copolymer has a molecular weight (Mn) of from 5,000 to about 100,000 and the production fluid is treated after it is recovered from an oil well.

8. The method of claim 7 wherein the ratio of the first monomer to the second monomer is from about 1:3 to about 3:1.

9. The method of claim 8 wherein the ratio of the first monomer to the second monomer is from about 1:2 to about 2:1.

10. The method of claim 7 wherein the production fluid is treated in downstream equipment selected from the group consisting of separators, desalters, and pipelines.

11. The method of claim 7 further comprising treating the production fluid with a compound that promotes the conversion of hydrogen sulfide to a dispersible sulfide scale.

12. A method for preventing or mitigating the formation of sulfide scale comprising treating production fluid with an additive comprising a terpolymer prepared using a formulation comprising dimethyldiallylammonium salt, 2-hydroxypropyl acrylate; and acrylic acid, wherein the terpolymer has a molecular weight (Mn) of from 5,000 to about 100,000.

13. The method of claim 12 wherein the molar ratio of the dimethyldiallylammonium salt to 2-hydroxypropyl acrylate to acrylic acid is about 3:1:3.

14. The method of claim 12 wherein the production fluid is treated downhole.

15. The method of claim 12 wherein the production fluid is treated after it is recovered from an oil well.

16. The method of claim 12 further comprising treating the production fluid with a compound that promotes the conversion of hydrogen sulfide to a dispersible sulfide scale.

\* \* \* \* \*